(12) United States Patent
Zeng et al.

(10) Patent No.: US 7,561,115 B2
(45) Date of Patent: Jul. 14, 2009

(54) RECONFIGURABLE NETWORK COMPONENT LAYERS

(75) Inventors: Dongsong Zeng, Germantown, MD (US); E. F. Charles LaBerge, Towson, MD (US)

(73) Assignee: Honeywell International Inc., Morristown, NJ (US)

( * ) Notice: Subject to any disclaimer, the term of this patent is extended or adjusted under 35 U.S.C. 154(b) by 118 days.

(21) Appl. No.: 11/754,570

(22) Filed: May 29, 2007

(65) Prior Publication Data

US 2008/0297194 A1    Dec. 4, 2008

(51) Int. Cl.
*H01Q 21/00* (2006.01)

(52) U.S. Cl. .................. 343/853; 343/700 MS (58) Field of Classification Search .......... 343/853, 343/700 MS, 909; 359/3, 9, 15, 128
See application file for complete search history.

(56) References Cited

U.S. PATENT DOCUMENTS 6,885,345 B2 * 4/2005 Jackson ............... 343/700 MS
6,985,109 B2   1/2006 Lust et al.
7,151,506 B2 * 12/2006 Knowles et al. ............. 343/909
7,420,524 B2 *  9/2008 Werner et al. ............... 343/909
2001/0050787 A1 * 12/2001 Crossland et al. ............. 359/15
2006/0222101 A1 * 10/2006 Cetiner et al. ............... 375/267

OTHER PUBLICATIONS

Cetiner, B.A. et al., "Monolithic Integration of RF MEMS Switches With a Diversity Antenna on PCB Substrates," IEEE Transactions on Microwave Theory and Techniques, vol. 51, No. 1, Jan. 2003.
Ghodsian, Bahram et al., "Development of RF-MEMS Switch on PCB Substrates With Polyimide Planarization," IEEE Sensors Journal, vol. 5, No. 5, Oct. 2005.

* cited by examiner

*Primary Examiner*—Hoang V Nguyen
(74) *Attorney, Agent, or Firm*—Fogg & Powers LLC (57) ABSTRACT

A method for configuring an electronics device having reconfigurable network component layers is disclosed. The method selects a first group of pixels from at least one of the reconfigurable network component layers to form a network component on a substrate of the electronics device and activates the network component in at least one plane of the device substrate using a plurality of micro-electromechanical system (MEMS) switches adjacent to the first group of selected pixels. The method adjusts a first shape of the activated network component for the electronics device using the reconfigurable network component layers.

19 Claims, 6 Drawing Sheets

RECONFIGURABLE NETWORK COMPONENT LAYERS

BACKGROUND

In the technology trend of software defined radio (for example), the reconfigurability of radio frequency (RF) network components is highly desirable. Reconfigurability describes a network's capability to dynamically change its own behavior, usually in response to dynamic changes in its operating environment. For example, in the context of wireless communications networks, reconfigurability describes the changeable behavior of the wireless network and any associated equipment and networking applications. Successful network component reconfigurations require a flexible framework to supply these desired configurations in any mainstream telecommunications applications.

SUMMARY

The following specification discusses reconfigurable network component layers. This summary is made by way of example and not by way of limitation. It is merely provided to aid the reader in understanding some aspects of at least one embodiment described in the following specification.

Particularly, in one embodiment, a method for configuring an electronics device having reconfigurable network component layers is provided. The method selects a first group of pixels from at least one of the reconfigurable network component layers to form a network component on a substrate of the electronics device and activates the network component in at least one plane of the device substrate using a plurality of micro-electromechanical system (MEMS) switches adjacent to the first group of selected pixels. The method adjusts a first shape of the activated network component for the electronics device using the reconfigurable network component layers.

DRAWINGS

These and other features, aspects, and advantages are better understood with regard to the following description, appended claims, and accompanying drawings where:

The various described features are drawn to emphasize features relevant to the teachings of the present application. Reference characters denote like elements throughout the figures and text of the specification.

DETAILED DESCRIPTION

The following detailed description describes at least one embodiment of reconfigurable network components for wireless communications networks using micro-electromechanical (MEMS) switches fabricated on printed circuit board (PCB) substrate layers. Advantageously, the MEMS switches integrate with the PCB substrate layers to form miniaturized reconfigurable RF components. For example, the miniaturized RF components can be dynamically configured as a general-purpose reconfigurable antenna, phase-shifter, and impedance matching network on a plurality of the PCB substrate layers. Recent developments in substrate technology have reduced the cost and complexity of this type of integration to provide a reconfigurable network component assembly as taught in the present application with the flexible framework desired.

The reconfigurable network component assembly discussed here is capable of dynamic network component configurations with respect to (for example) antenna radiation and polarization characteristics, phase-shifting, and impedance matching for wired and wireless communication networks. The assembly is ideally suited for uniform software defined radio (SDR) hardware architectures, in the spatial diversity exploration of multiple-input-multiple-output (MIMO) radio systems, and in various other areas. In one implementation, with reference to wireless communication systems, the MIMO radio systems would use the reconfigurable network component layers at both a transmitter end and a receiver end.

The reconfigurable network component layers discussed here consist of at least one array of small micro-strip patches with each patch connecting to adjacent patches through a plurality of MEMS switches. Turning on and off each of the individual MEMS switches configures the network components as desired. In addition, the teachings of the present application discuss (1) a configuration software application package and (2) a component processing program which (in one implementation) is embedded in a programmable processor on the device substrate for dynamic configuration of the network component layers at runtime. For example, predetermined component configurations are stored in the application software for later retrieval, meaning that (in one implementation) the network component layers are reconfigured in real time.

Figure 1:
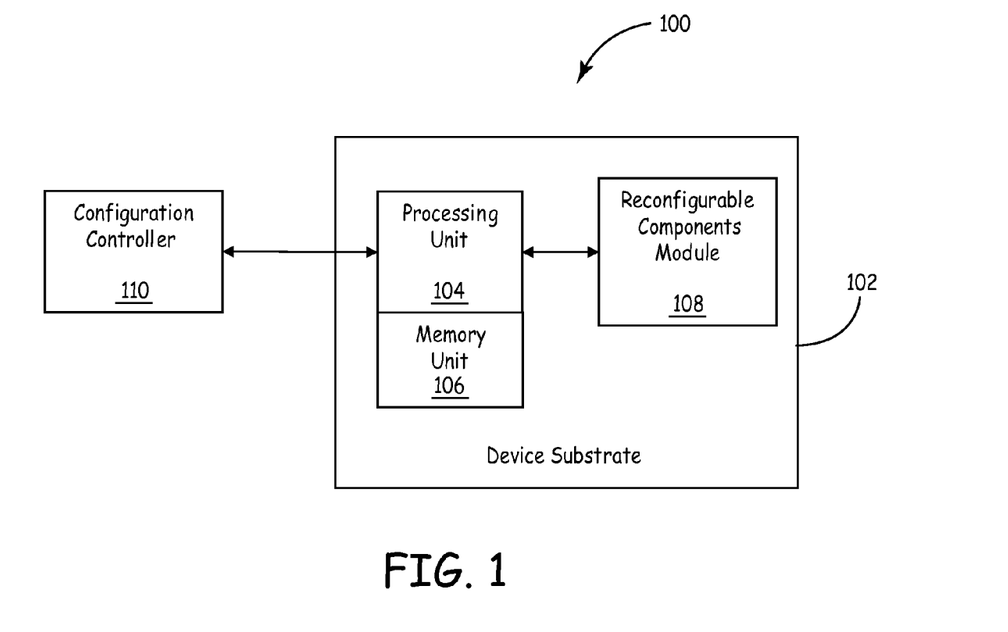
FIG. 1 is a block diagram of an electronics assembly.

FIG. 1 is a block diagram of an electronics assembly 100. The assembly 100 comprises a device substrate 102 and a configuration controller 110 in communication with the device substrate 102. In the example embodiment of FIG. 1, the device substrate 102 is fabricated on at least one PCB substrate layer. The device substrate 102 further comprises a processing unit 104, a memory unit 106 responsive to the processing unit 104, and a reconfigurable components module 108 responsive to the processing unit 104. The processing unit 104 is at least one of a microcontroller, a complex programmable logic device (CPLD), a field-programmable gate array (FPGA), and a field-programmable object array (FPOA). In one implementation, the memory unit 106 is a portion of (that is, resides within) the processing unit 104. The reconfigurable components module 108 includes at least one reconfigurable network component layer. It is understood that the reconfigurable components module 108 is capable of accommodating any appropriate number of reconfigurable network component layers (for example, a plurality of reconfigurable network component layers) in a single device substrate 102.

In operation, the processing unit 104 selects a first group of pixels from at least one layer of the reconfigurable components module 108 (based on a configuration provided by the configuration controller 110, for example) to form at least one network component on the device substrate 102. The processing unit 104 activates the at least one network component in at least one plane of the device substrate 102 (as instructed by the configuration controller 110) using a plurality of MEMS switches adjacent to the first group of selected pixels, as further discussed below with respect to FIGS. 2 and 3. In one implementation, the configuration controller 110 is a simulation device (for example, at least one of a computer workstation, an SDR configuration device, and the like) that determines a first shape of the at least one network component. Moreover, the configuration controller 110 further configures the processing unit 104 to dynamically tune the activated network component for the electronics assembly 100 using the reconfigurable components module 108. In one implementation, the memory unit 106 stores a plurality of configurations of the at least one network component. The plurality of configurations are recalled from the memory unit 106 by the processing unit 104 to dynamically tune the activated network component and adjust the first shape of the at least one network component. Examples of the plurality of configurations include at least one of an antenna, a phase shifter, and an impedance matching network.

Figures 2, 2I:
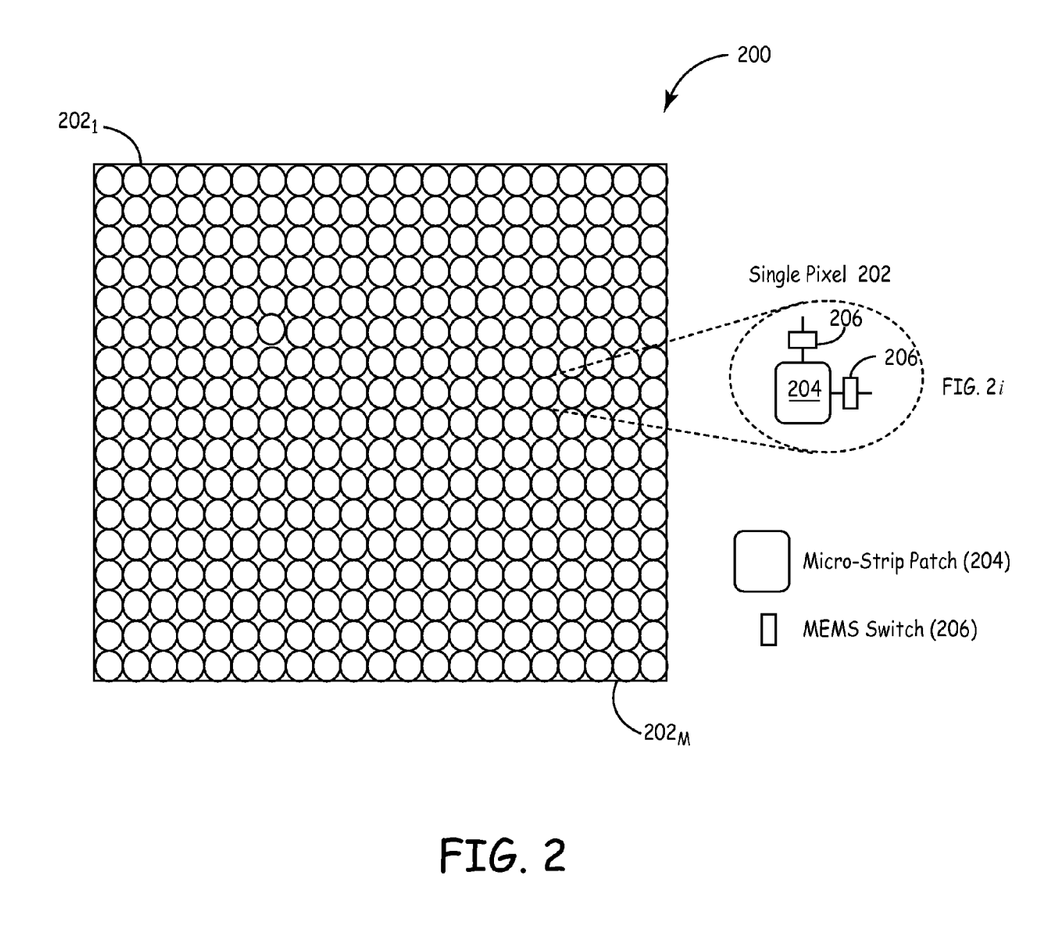
FIG. 2 is a block diagram of an electronics module.
FIG. 2i is an enlarged view of the module of FIG. 2.

FIG. 2 is a block diagram of the reconfigurable components module 108 of FIG. 1, a reconfigurable network component layer 200. The layer 200 comprises a first pixel array $202_1$, to $202_M$. A single pixel 202 is further illustrated in FIG. 2i. FIG. 2i illustrates at least two MEMS switches 206 linked to a micro-strip patch 204. The layer 200 forms the first pixel array 202 on at least one layer of the micro-strip patches 204. In one implementation, each of the micro-strip patches 204 is composed of metal. Each of the micro-strip patches 204 links with adjacent micro-strip patches 204 through the plurality of MEMS switches 206. For example, once the reconfigurable components module 108 is configured by the configuration controller 110 of FIG. 1, the plurality of MEMS switches 206 link selected pixels of the first pixel array 202 to form the at least one network component. In at least one alternate implementation, pixels 202 stacked between component layers in the reconfigurable components module 108 form the at least one network component, as further described below with respect to FIG. 3.

In an example embodiment of FIG. 2, the MEMS switches 206 have an area of about 5000 $\mu m^2$, with the area of each of the micro-strip patches 204 ranging from 5000 $\mu m^2$ to at least 2 $mm^2$. For example, a typical 100×100 single layer pixel array 202 will have a dimension of 2500 $mm^2$. Moreover, for M×N MEMS switches 206 on the single layer pixel array 202, the reconfigurable components module 108 includes at least M+N control connections from the processing unit 104. The M+N control connections are operable to switch the linked pixels of the first pixel array 202 between ON and OFF states, as further discussed below with respect to FIGS. 4 and 5.

Figure 3:
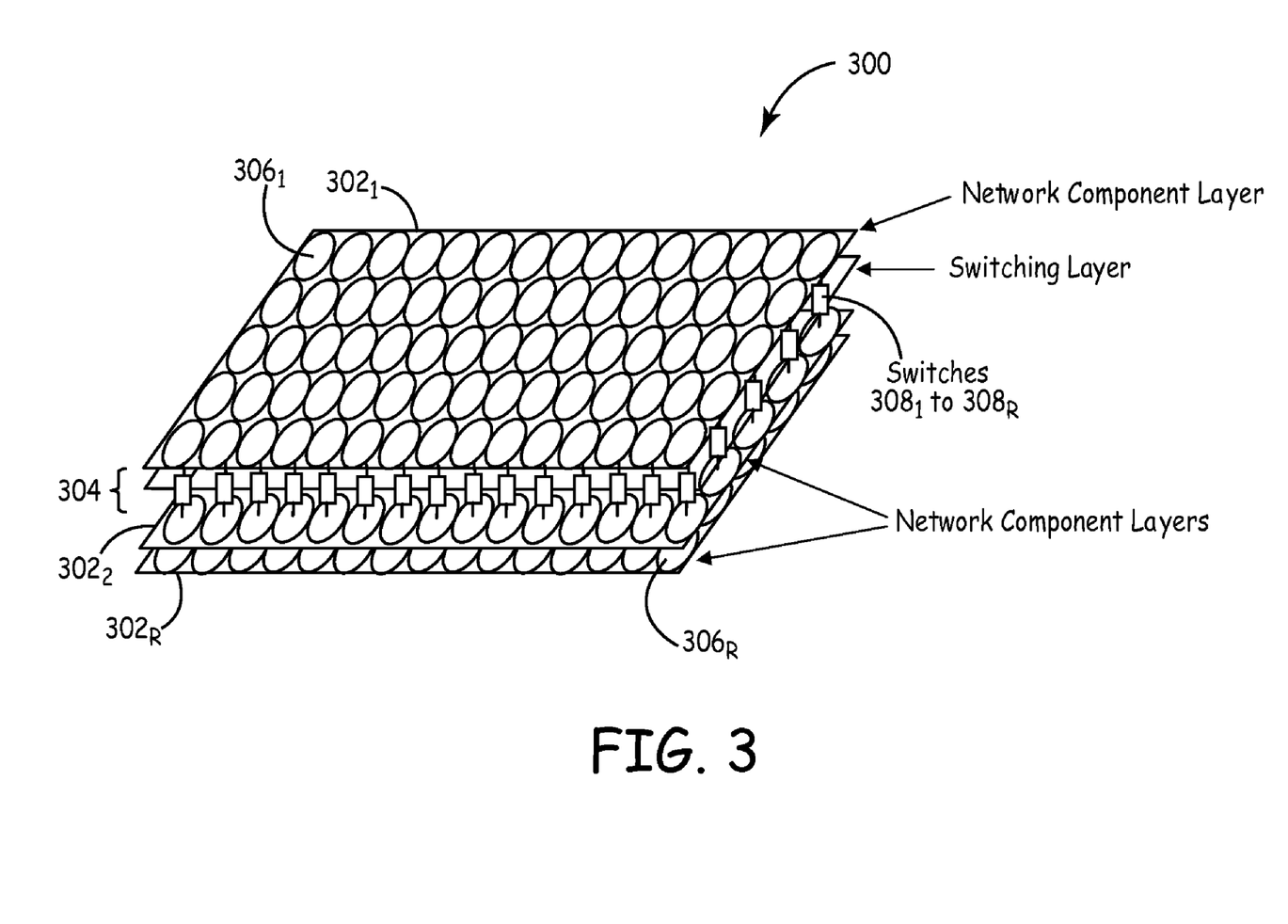
FIG. 3 is an elevated perspective view of the module of FIG. 2.

FIG. 3 is an elevated perspective view of a reconfigurable components module 300. The module 300 comprises reconfigurable network component layers $302_1$ to $302_R$ and a first switching layer 304. Each of the reconfigurable network component layers 302 further comprises pixels $306_1$ to $306_R$. The first switching layer 304 includes at least a portion of the plurality of MEMS switches 206 of FIG. 2, shown in FIG. 3 as MEMS switches $308_1$ to $308_R$. In the example embodiment of FIG. 3, the first switching layer 304 is inserted between at least two of the reconfigurable network component layers $302_1$ to $302_R$. Moreover, each of the pixels 306 links with at least two of the MEMS switches 308 that link to adjacent pixels 306 in the same plane and at least one MEMS switch 308 in the first switching layer 304. For example, when R layers of pixels are stacked as illustrated in FIG. 3, R-1 switching layers 304 link the pixels 306 together on each of the layers $302_1$ to $302_R$.

In operation, the processing unit 104 alters a first group of selected pixels from the pixels $306_1$ to $306_R$ to at least one state in each of the reconfigurable network component layers $302_1$ to $302_R$ (based on a configuration provided by the configuration controller 110 of FIG. 1, for example). The altered pixels 306 are arranged in the first shape of the at least one network component as further described below with respect to example configurations shown below with respect to FIGS. 4 and 5. These example configurations are shown by way of example and not by way of limitation.

Figure 4:
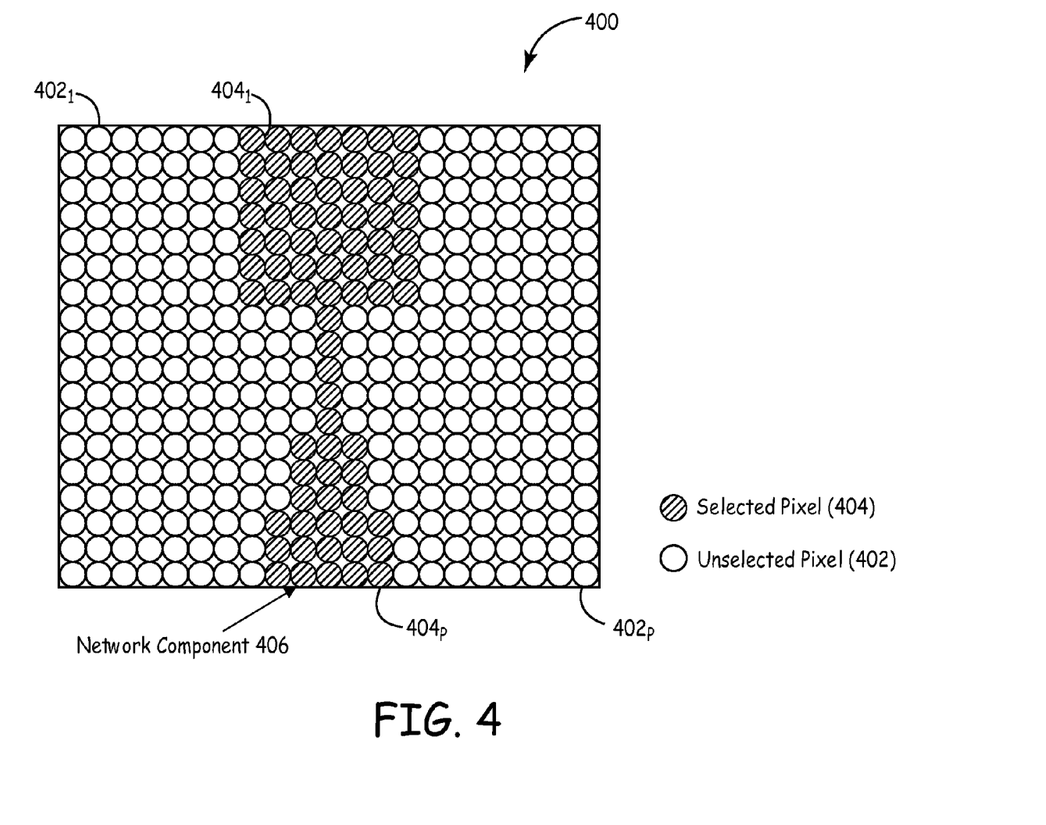
FIG. 4 is a block diagram of an embodiment of an electronics module.
Figure 5:
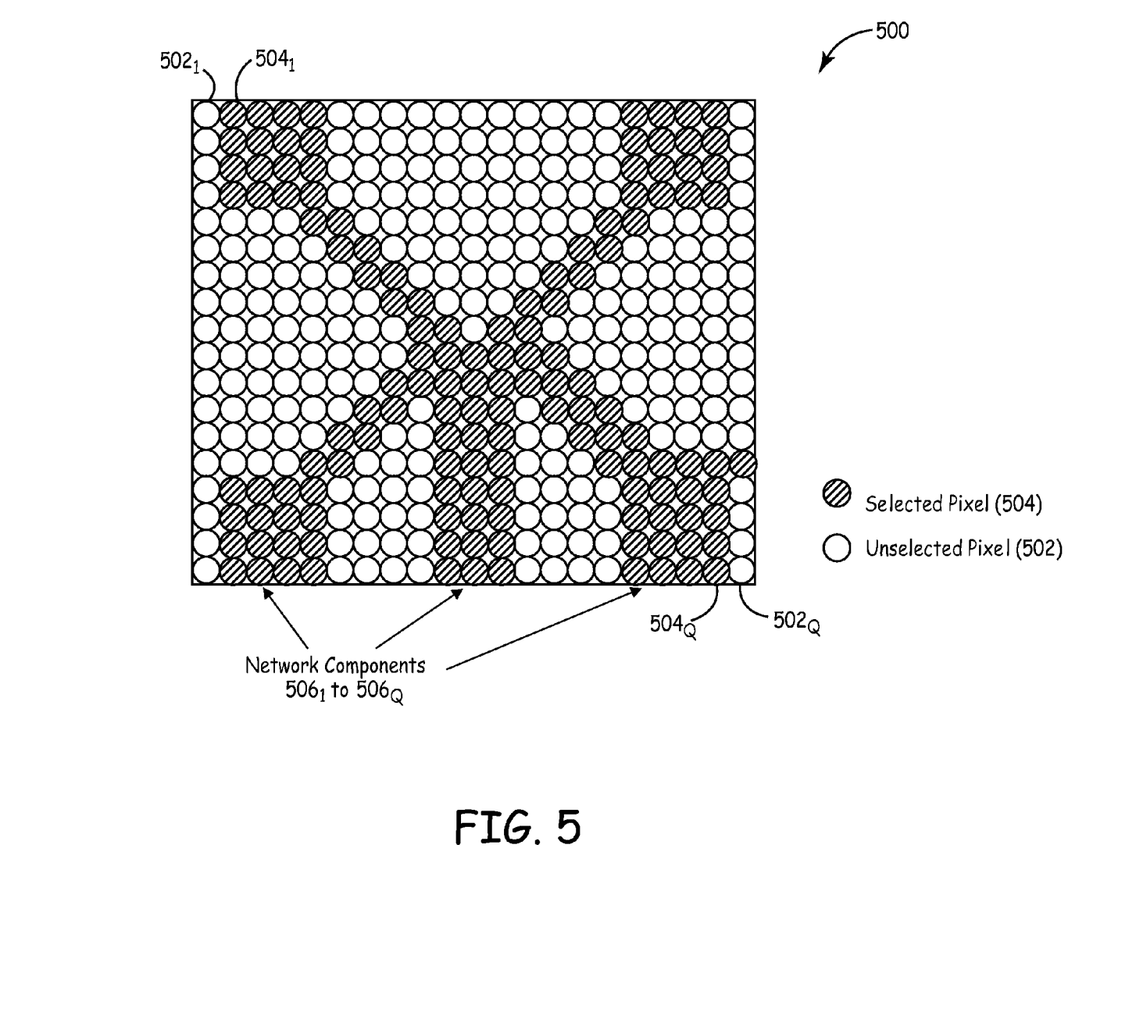
FIG. 5 is a block diagram of an embodiment of an electronics module.

FIGS. 4 and 5 are block diagrams of example embodiments of activated reconfigurable network component layers. A component layer 400 (500) comprises unselected pixels $402_1$ to $402_P$ ($502_1$ to $502_Q$) and selected pixels $404_1$ to $404_P$ ($504_1$ to $504_Q$). The selected pixels $404_1$ to $404_P$ ($504_1$ to $504_Q$) are arranged as a network component 406 (network components $506_1$ to $506_Q$). For example, FIG. 4 illustrates a single patch antenna configuration for the reconfigurable components module 108, where the MEMS switches 206 adjacent to the selected pixels $404_1$ to $404_P$ are in an ON state, and the MEMS switches 206 adjacent to the unselected pixels $402_1$ to $402_P$ are in an OFF state. The first shape of the network component 406 substantially resembles a traditional patch antenna with varying radiation characteristics (for example, an antenna impedance). A desired antenna impedance for the network component 406 is finely tuned by selecting or unselecting pixels using (for example) the configuration controller 110. As a further example, FIG. 5 represents an embodiment of a phased array antenna with at least four antenna elements included in the network components $506_1$ to $506_Q$. Similar to the network component 406, phase differences and antenna impedance among the at least four antenna elements are tuned by adjusting the shape of the antenna elements included in the network components $506_1$ to $506_Q$.

In operation, the processing unit 104 (in one implementation) recalls at least one network component configuration of at least the first form of the network component(s) 406 ($506_1$ to $506_Q$) from the memory unit 106. The processing unit 104 selects a first group of pixels 404 (504) on at least one of the reconfigurable network component layers 400 (500) to form the recalled network component(s) 406 ($506_1$ to $506_Q$). The processing unit 104 arranges the recalled network component(s) 406 ($506_1$ to $506_Q$) in at least one plane of the device substrate 102 using a plurality of the MEMS switches 204 to couple the first group of selected pixels 404 (504). Based on additional commands received (for example, from the configuration controller 110), the processing unit 104 updates the configuration of the network component(s) 406 ($506_1$ to $506_Q$) in real time. In one implementation, the processing unit 104 alters at least one state of each of the selected pixels $404_1$ to $404_P$ ($504_1$ to $504_Q$), and arranges the altered pixels in the first form of the recalled network component(s) 406 ($506_1$ to $506_Q$). Moreover, the processing unit 104 activates the selected pixels $404_1$ to $404_P$ ($504_1$ to $504_Q$) with the MEMS switches 308 of FIG. 3 (for example, stacked as the first switching layer 304) between the reconfigurable network component layers 400 (500).

In at least one embodiment, further characterization of the network components illustrated in FIGS. 4 and 5 is accomplished by the configuration controller 110. The configuration controller 110 will (for example) initialize at least a component dimension, arrange the pixels, and determine the number of reconfigurable component layers 400 (500) for use in calibrating and simulating any operating characteristics of at least one network component configuration described here. In at least one alternate implementation, the characterization accomplished by the configuration controller 110 is programmed into the processing unit 104 for configuration of the network component(s) 406 ($506_1$ to $506_Q$) in real time. To update the configuration of the network component(s) 406

($506_1$ to $506_Q$) in real time, the processing unit 104 adjusts the first shape of the recalled network component(s) 406 ($506_1$ to $506_Q$) and further characterizes the network component (as discussed above). The processing unit 104 adjusts the first shape of the recalled network component(s) 406 ($506_1$ to $506_Q$) by activating (for example) any of the unselected pixels $402_1$ to $402_P$ ($502_1$ to $502_Q$) on the reconfigurable network component layers 400 (500), and deactivating any currently selected pixels (for example, any of the selected pixels $404_1$ to $404_P$ and $504_1$ to $504_Q$) from the first array of selected pixels 404 (504) on the reconfigurable network component layers 400 (500).

Figure 6:
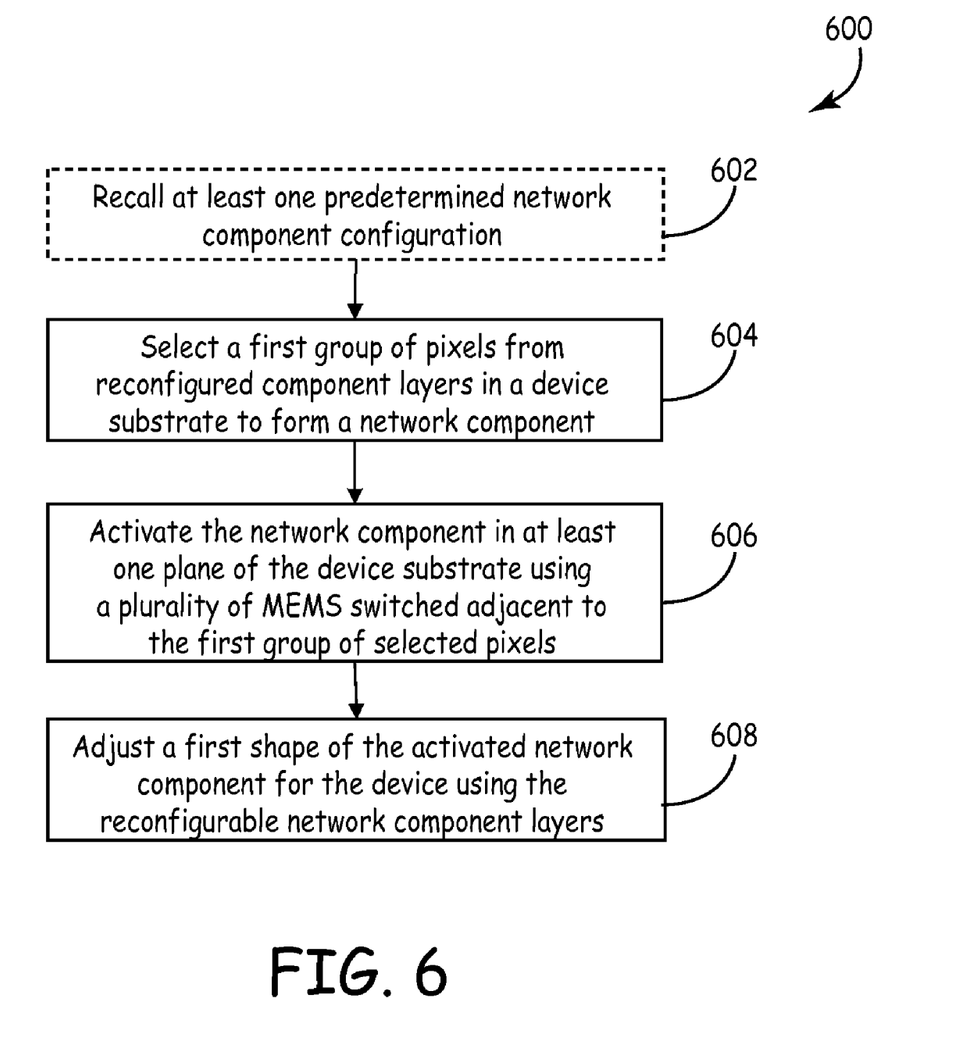
FIG. 6 is a flow diagram of a method for configuring an electronics device having reconfigurable network component layers.

FIG. 6 is a flow diagram illustrating a method 600 for configuring an electronics device having reconfigurable network component layers. For example, the method of FIG. 6 configures the reconfigurable components module 108 on the device substrate 102 of FIG. 1. The method 600 addresses configuring at least one embodiment of reconfigurable network components for wireless communications networks using MEMS switches fabricated between PCB substrate layers (for example, the first mezzanine layer 304 fabricated between the reconfigurable network component layers $302_1$ to $302_R$). Advantageously, the MEMS switches (for example, the MEMS switches 206) form the miniaturized RF components using the reconfigurable network component layers discussed above in FIGS. 2 to 5. In at least one implementation, the processing unit 104 (alternatively, the configuration controller 110) recalls at least one predetermined network component configuration from the memory unit 106 at optional block 602.

At block 604, the configuration controller 110 selects a first group of pixels from at least one of the reconfigurable network component layers 302 to form a network component on the device substrate 102. For example, in one embodiment, the formed network component comprises the at least one predetermined network component configuration from optional block 602. At block 606, the processing unit 104 activates the network component in at least one plane of the device substrate 102 using a plurality of the MEMS switches 206 adjacent to the first array of selected pixels (for example, the selected pixels $504_1$ to $504_Q$ of FIG. 5). In one implementation, the configuration controller 110 alters at least one state of each of the selected pixels, with the altered pixels arranged in a first form of the network component. At block 608, the processing unit 104 (for example) adjusts the first shape of the activated network component for the communications device 100 with the reconfigurable network component layers of the network component module 108. In one implementation, the processing unit 104 dynamically tunes the network component to further characterize the activated network component. The first shape is further characterized by activating additional pixels on at least one of the reconfigurable network component layers and when currently selected pixels are deactivated from the first group of selected pixels.

In one implementation, the network component module 108 forms an array of pixels to include the first group of pixels on at least one layer of micro-strip patches (for example, the micro-strip patches 204 of FIG. 2), where each of the micro-strip patches 204 link adjacent micro-strip patches 204 through the plurality of the MEMS switches 206. The reconfigurable network component layers are stacked with at least a portion of the plurality of the MEMS switches 206 in a switching layer (for example, the first switching layer 304) between at least two of the component layers 302.

The embodiments discussed herein can be implemented in a combination of digital electronic circuitry and software residing in a programmable processor (for example, a general-purpose processor in a computer). Apparatus embodying these techniques comprise appropriate input and output devices, a programmable processor, and a machine-readable medium tangibly embodying program instructions for execution by the programmable processor. A process that embodies these techniques can be performed by the programmable processor executing a program of machine-readable instructions operating on input data and generating appropriate output data. The machine-readable instructions are executable on a system including the programmable processor and coupled to receive data and instructions from (and to transmit data and instructions to) a data storage system, an input device, or an output device. Generally, the programmable processor will receive instructions and data from a read only memory (ROM) or a random access memory (RAM). Storage media suitable for tangibly embodying these program instructions and data include all forms of non-volatile memory, and include by way of example, semiconductor memory devices; ROM and flash memory devices; magnetic disks (such as internal hard disks and removable disks); and other computer-readable media.

This description has been presented for purposes of illustration, and is not intended to be exhaustive or limited to the embodiments disclosed. The embodiments disclosed are intended to cover any modifications, adaptations, or variations which fall within the scope of the following claims.

What is claimed is:

1. A method for configuring an electronics device having reconfigurable network component layers, the method comprising:

selecting a first group of pixels from at least one of the reconfigurable network component layers to form a network component on a substrate of the electronics device;

activating the network component in at least one plane of the device substrate using a plurality of micro-electro-mechanical system (MEMS) switches adjacent to the first group of selected pixels; and adjusting a first shape of the activated network component for the electronics device via a configuration controller communicatively coupled to the substrate of the electronic device, the configuration controller operable to simulate and determine the first shape of the activated network component using the reconfigurable network component layers.

2. The method of claim 1, and further comprising:

forming an array of pixels to include the selected pixels on at least one layer of micro-strip patches, each of the micro-strip patches linking adjacent micro-strip patches through the plurality of MEMS switches; and stacking at least a portion of the plurality of MEMS switches in a first switching layer between one or more of the reconfigurable network component layers.

3. The method of claim 1, wherein selecting the first group of pixels comprises recalling at least one predetermined network component configuration.

4. The method of claim 1, wherein activating the network component comprises:

altering at least one state of each of the selected pixels; and arranging the altered pixels in a first form of the network component.

5. The method of claim 1, wherein adjusting the first shape of the activated network component comprises dynamically tuning the network component to further characterize the activated network component.

6. The method of claim 5, wherein dynamically tuning the network component comprises at least one of:
- activating additional pixels on at least one of the reconfigurable network component layers; and
- deactivating currently selected pixels from the first group of selected pixels.

7. An electronics assembly, comprising:
- a device substrate, including:
  - a processing unit,
  - a memory unit responsive to the processing unit, and
  - a reconfigurable components module responsive to the processing unit; and
- a configuration controller in communication with the device substrate, the configuration controller operable to configure the processing unit to:
  - select a first group of pixels from at least one layer of the reconfigurable components module to form at least one network component on the device substrate;
  - activate the at least one network component in at least one plane of the device substrate using a plurality of micro-electromechanical system (MEMS) switches adjacent to the first group of selected pixels, at least a portion of the plurality of MEMS switches inserted as a first switching layer between at least two layers of the reconfigurable components module; and
  - dynamically tune the activated network component for the electronics assembly using the reconfigurable components module.

8. The assembly of claim 7, wherein the processing unit is at least one of a microcontroller, a complex programmable logic device, a field-programmable gate array, and a field-programmable object array.

9. The assembly of claim 7, wherein the memory unit stores a plurality of configurations of the at least one network component.

10. The assembly of claim 9, wherein the plurality of configurations include at least one of an antenna, a phase shifter, and an impedance matching network.

11. The assembly of claim 7, wherein the device substrate is fabricated on at least one printed circuit board (PCB) substrate layer.

12. The assembly of claim 7, wherein the reconfigurable components module comprises a pixel array formed on at least one layer of micro-strip patches, each of the micro-strip patches linking adjacent micro-strip patches through the plurality of MEMS switches.

13. The assembly of claim 12, wherein the at least one layer of micro-strip patches is composed of metal.

14. The assembly of claim 7, wherein the configuration controller is a simulation device that determines a first shape of the at least one network component.

15. A program product comprising program instructions, embodied on a machine-readable medium, the program instructions cause at least one programmable processor in a device substrate with reconfigurable network component layers to:
- recall at least one network component configuration from memory;
- select a first group of pixels on at least one of the reconfigurable network component layers to form the recalled network component;
- arrange the recalled network component in at least one plane of the device substrate using a plurality of micro-electromechanical system (MEMS) switches to couple the first group of selected pixels; and
- update the at least one network component configuration in real time based on additional commands received by the programmable processor.

16. The program product of claim 15, wherein the program instructions that select the first array of pixels cause the at least one programmable processor to alter at least one state of each of the selected pixels, the altered pixels arranged in a first form of the recalled network component.

17. The program product of claim 15, wherein the program instructions that arrange the recalled network component cause the at least one programmable processor to activate the selected pixels with the MEMS switches stacked between the reconfigurable network component layers.

18. The program product of claim 15, wherein the program instructions that update the at least one network component configuration cause the at least one programmable processor to adjust a first shape of the recalled network component to further characterize the network component.

19. The program product of claim 18, wherein the program instructions that adjust the first shape of the recalled network component cause the at least one programmable processor to:
- activate additional pixels on at least one of the reconfigurable network component layers; and
- deactivating currently selected pixels from the first group of selected pixels.

* * * * *